US012227367B2

(12) United States Patent
Seager et al.

(10) Patent No.: US 12,227,367 B2
(45) Date of Patent: Feb. 18, 2025

(54) FEEDING OF FOOD PRODUCTS IN SLICING OR PORTIONING MACHINES (71) Applicant: THURNE-MIDDLEBY LTD, Norwich (GB)

(72) Inventors: Richard Seager, Norwich (GB); James Wakefield, Norwich (GB)

(73) Assignee: THURNE-MIDDLEBY LTD (GB)

( * ) Notice: Subject to any disclaimer, the term of this patent is extended or adjusted under 35 U.S.C. 154(b) by 146 days.

(21) Appl. No.: 17/605,431

(22) PCT Filed: Apr. 28, 2020

(86) PCT No.: PCT/GB2020/051033
§ 371 (c)(1),
(2) Date: Oct. 21, 2021

(87) PCT Pub. No.: WO2020/225529
PCT Pub. Date: Nov. 12, 2020

(65) Prior Publication Data
US 2022/0242677 A1  Aug. 4, 2022

(30) Foreign Application Priority Data
May 3, 2019  (GB) ...................... 1906230

(51) Int. Cl.
B65G 43/08  (2006.01)
B26D 7/06  (2006.01)
(52) U.S. Cl.
CPC .......... B65G 43/08 (2013.01); B26D 7/0625 (2013.01); B26D 2210/02 (2013.01)

(58) Field of Classification Search
CPC .... B26D 7/0625; B26D 2210/02; B26D 5/20; B26D 7/30; A22C 17/002; A22C 17/0023
See application file for complete search history.

(56) References Cited

U.S. PATENT DOCUMENTS 3,634,741 A * 1/1972 Kasper ................... B26D 7/30
83/72
3,776,073 A * 12/1973 Runge .................. B26D 7/0608
83/241
4,226,147 A * 10/1980 Kumzi ................. B26D 7/0683
83/37
(Continued)

FOREIGN PATENT DOCUMENTS

DE       19604254       8/1997
DE      102006052689    5/2008
(Continued)

OTHER PUBLICATIONS

Notification of Grant issued in Appl. No. 1906230.6 (Aug. 2, 2022).
(Continued)

Primary Examiner — Sean M Michalski
(74) Attorney, Agent, or Firm — Barnes & Thornburg LLP (57) ABSTRACT A food processing machine (10) and a method of cutting slices or portions from a food product (60, 70, 72, 74) in a food processing machine are described. The food processing machine comprises a cutter (30) to cut portions from a food product and a sensing apparatus (43, 45) configured to sense a profile of the food product. The machine is arranged to control sensing and cutting feed rates independently.

22 Claims, 4 Drawing Sheets

(56) References Cited

U.S. PATENT DOCUMENTS

| | | | | | |
|---|---|---|---|---|---|
| 4,552,048 | A | * | 11/1985 | Wallace | B26D 7/32 83/72 |
| 4,967,652 | A | * | 11/1990 | Mally | A22C 7/0023 100/153 |
| 5,142,956 | A | * | 9/1992 | Ueno | A21C 3/06 83/155.1 |
| 5,163,865 | A | * | 11/1992 | Smith | A22C 25/18 83/956 |
| 5,165,314 | A | * | 11/1992 | Paulson | B26D 7/015 83/594 |
| 5,181,445 | A | * | 1/1993 | Cothrell | B27B 31/006 83/155 |
| 5,585,603 | A | * | 12/1996 | Vogeley, Jr. | G01G 9/005 177/1 |
| 5,741,536 | A | * | 4/1998 | Mauer | A23B 4/0056 99/476 |
| 5,937,080 | A | * | 8/1999 | Vogeley, Jr. | B26D 7/30 382/110 |
| 6,168,008 | B1 | * | 1/2001 | Sting | B65G 23/28 198/461.2 |
| 6,407,818 | B1 | * | 6/2002 | Whitehouse | G01B 11/00 356/627 |
| 6,882,434 | B1 | | 4/2005 | Sandberg et al. | |
| 7,450,247 | B2 | | 11/2008 | Sandberg et al. | |
| 7,623,249 | B2 | | 11/2009 | Sandberg et al. | |
| 9,919,445 | B2 | * | 3/2018 | Mikkelsen | B23K 26/38 |
| 10,093,442 | B1 | | 10/2018 | Rooyakkers | B65G 15/14 |
| 10,245,745 | B2 | * | 4/2019 | Völkl | A22C 17/02 |
| 11,180,323 | B2 | * | 11/2021 | Middelberg | B65G 47/295 |
| 11,213,037 | B2 | * | 1/2022 | Völkl | A23P 30/10 |
| 2003/0145699 | A1 | * | 8/2003 | Kim | B26D 5/34 83/13 |
| 2003/0209116 | A1 | * | 11/2003 | Culpepper | B27B 5/188 83/13 |
| 2005/0120844 | A1 | * | 6/2005 | Weber | B26D 5/007 83/76.8 |
| 2006/0154587 | A1 | * | 7/2006 | Mikkelsen | A22C 25/18 452/150 |
| 2006/0162518 | A1 | * | 7/2006 | Biggs | B26D 7/30 83/77 |
| 2007/0089573 | A1 | * | 4/2007 | Williams | B26D 3/166 82/47 |
| 2012/0285303 | A1 | * | 11/2012 | Porat | B26D 7/0641 83/13 |
| 2015/0273714 | A1 | * | 10/2015 | Graushar | B26D 5/20 83/209 |
| 2016/0288355 | A1 | | 6/2016 | Sorensen et al. | |
| 2019/0030740 | A1 | * | 1/2019 | Grasselli | B26D 7/0625 |
| 2019/0152084 | A1 | | 5/2019 | Schmeiser | |
| 2021/0354325 | A1 | * | 11/2021 | Voelkl | B26D 7/32 |
| 2023/0135169 | A1 | * | 5/2023 | Mayer | B26D 7/0683 99/537 |

FOREIGN PATENT DOCUMENTS

| | | |
|---|---|---|
| DE | 102016120982 | 5/2018 |
| EP | 1178878 | 2/2002 |
| EP | 1782929 | 5/2007 |
| EP | 2278616 | 1/2011 |
| EP | 2878203 | 6/2015 |
| GB | 2377362 | 1/2003 |
| WO | 2004/034794 | 4/2004 |
| WO | 2004/062375 | 7/2004 |
| WO | 2011/053601 | 5/2011 |
| WO | 2017/133977 | 8/2017 |

OTHER PUBLICATIONS

"Cashin Edge" slicing machine, accessed on-line at: https://www.youtube.com/watch?v=wwwtchtTeoE, (Jun. 4, 2014).
Search Report issued in Appl. No. GB1903230.6 (2019).
Search Report & Written Opinion issued in Appl. No. PCT/GB2020/051033 (2020).

* cited by examiner

FEEDING OF FOOD PRODUCTS IN SLICING OR PORTIONING MACHINES

CROSS-REFERENCE TO RELATED APPLICATIONS

This application is a United States national stage application under 35 USC § 371 of PCT Application No. PCT/GB2020/051033, filed on Apr. 28, 2020, which claims priority from United Kingdom Application No. GB 1906230.6, filed on May 3, 2019, the entirety of each are fully incorporated by reference herein.

FIELD OF THE INVENTION

The present invention relates to a food processing machine and a method of cutting slices or portions from a food product in a food processing machine and more particularly to the feeding of a food product towards the cutter of such a machine.

BACKGROUND TO THE INVENTION

It is known to feed food products such as bacon, cheese or cooked meat towards a cutting region in a food processing machine using product drivers such as belt conveyors, tracks or toothed rollers. The food product, which may be in the form of a loaf, log or block for example, is fed incrementally towards the cutting region, where slices or portions of a desired size are cut from a leading end of the food product.

SUMMARY OF THE INVENTION

The present invention provides a food processing machine comprising:
  a cutter configured to cut portions from a food product;
  a transport system arranged to carry a food product to the cutter; and
  a sensing apparatus configured to sense a profile of part of the food product as the food product is carried through a sensing region of the machine by the transport system,
  wherein the transport system comprises:
  a first feeder system which feeds the food product through the sensing region at a sensing feed rate; and
  a second feeder system downstream of the sensing region which feeds the food product towards the cutter at a cutting feed rate, and
  the machine is arranged to control the sensing and cutting feed rates independently.

This independent feed rate control provides flexibility in the way in which the food product is fed through a sensing region and to the cutter. By providing a sensing apparatus within the same machine as the cutter, the overall footprint of a processing configuration which provides product profile detection and cutting can be reduced. Furthermore, the independent control of the sensing and cutting feed rates may allow the overall speed of carrying out both these processes within the same machine to be increased. The feed rates may be adjusted for different food product lengths where appropriate to increase the rate of product throughput. The independent feed rate control may allow the sensing and cutting feed rates to be different as and when required.

Each feeder system may be formed of one or more product drivers. Each driver may comprise an endless track or belt, a roller, a spiked roller, an array or series of rollers, endless toothed tracks, or endless spiked chains, for example.

The first feeder system may be located upstream of the sensing region. The second feeder system may feed the food product towards and past the cutter so as to control the size of each slice or portion cut from the leading end of the food product.

In some embodiments, a food product is continuously constrained by the transport system as the food product travels through the sensing region and from the sensing region to the cutter. By providing a sensing apparatus in the same machine as the cutter, it is possible to provide continuous constraint of the food product through the sensing region and from the sensing region to the cutter. This facilitates more precise control of the size of the slices or portions cut from the food product by the cutter. In existing processing lines, product scanning is carried out in a machine separate to that used for cutting the food product. In such an arrangement, there is a risk that the product may shift laterally or rotate between scanning and cutting, thereby reducing the accuracy of the cutting process.

In examples of the present food processing machine, a food product may be restrained against movement relative to the surface(s) of the transport system which are in contact with the food product. In this way, the lateral position and/or the orientation of the food product within the machine may be continuously controlled whilst it is carried by the transport system through the sensing region and to the cutter.

The first and/or second feeder systems may engage with both upper and lower surfaces of a food product so as to constrain it.

The transport system may be configured to feed a food product at least part of the way towards the cutter (that is, before cutting of the product has started) at a different, preferably higher feed rate than the cutting feed rate used for the food product during cutting of the product (or the preceding food product).

The cutting feed rate may be the speed (or average speed) at which the product is moved towards the cutter whilst the product is downstream of the sensing region, and more particularly, may be the speed (or average speed) at which the product is moved towards the cutter whilst slices or portions are cut from its leading end. If groups of slices or portions are being cut from the food product, it may be necessary to pause the feeding of the product towards the cutter briefly to allow a completed group to be transported away from the cutter before cutting slices or portions of the next group. In this case, the cutting feed rate may be the average speed with which the food product is moved towards the cutter including any such pauses whilst slices or portions are cut from its leading end.

In some circumstances, it may be advantageous for the transport system to be configured to feed a food product through the sensing region at a sensing feed rate which is greater or less than the cutting feed rate used for the food product during cutting of the product (or the immediately preceding product). In some circumstances, a slower sensing feed rate may be selected to allow the profile of the food product to be sensed or scanning at a higher resolution.

The transport system may be switchable between a first feed mode in which the sensing feed rate substantially matches the cutting feed rate, and a second feed mode in which a food product is fed by the transport system at least part of the way towards the cutter at a higher feed rate than the cutting feed rate used for the food product during cutting thereof. This versatility may allow the feeding of a food product to be altered depending on the food product length.

In some examples, the transport system may be selectively operable in one of a first retract mode in which both the first and second feeder systems are operated so as to retract a food product away from the cutter, and a second retract mode in which only the second feeder system is operated so as to retract a food product away from the cutter. If the machine is being used to cut groups of slices or portions, it may be desirable to briefly retract the food product away from the cutter to pause slicing, allowing a completed group to be conveyed away from the cutter before cutting of the next group is started. With a longer product, it may be desirable to use both the first and second feeder systems to retract the food product in this manner, whilst a shorter product, or a remaining portion of a longer product may only be in engagement with the second feeder system and so only the second feeder system would need to be operated so as to retract a food product away from the cutter. Operation of the first feeder system could then take place independently of the second feeder system.

The first feeder system may comprise product drivers located upstream and downstream from the sensing region. A gap may be defined between the upstream and downstream drivers of the first feeder system to expose a surface of the food product so that its profile can be sensed by the sensing apparatus. The upstream and downstream product drivers of the first feeder system may be driven by a common motor. Both upper and lower surfaces of a food product may be exposed between the upstream and downstream product drivers. In some preferred embodiments, a complete circumferential lateral profile of a food product may be exposed between the upstream and downstream product drivers.

The first feeder system may comprise first upper and first lower product drivers configured to engage with upper and lower surfaces of a food product, respectively. They may be located upstream of the sensing region. The first upper product driver may comprise a roller or a conveyor, for example. In some configurations, the first upper product driver may be carried by an arm which is pivotably mounted in the machine. The first feeder system may define a first support plane on which food products are fed along a first feed direction by the first feeder system, and the arm may be rotatable about an axis perpendicular to the first feed direction and parallel to the support plane. The first lower product driver may comprise an endless track or belt.

Mounting the roller on a pivotable arm enables constraint of variable height products to be improved as they enter the first feeder system. The roller may be biased or urged in a downwards direction towards the lower product feeder by the pivotable arm. The biasing force exerted by the arm may be varied by the machine. For example, a lower biasing force may be applied as a product is initially inserted below the roller, and the biasing force may then be increased by the machine. The biasing force may be increased after the roller has been raised by the product so that the roller more reliably constrains the product against the lower product feeder.

The downstream product drivers of the first feeder system may comprise downstream upper and downstream lower endless drive tracks or belts configured to engage upper and lower surfaces of a food product, respectively.

The second feeder system may comprise second upper and second lower product drivers configured to engage with upper and lower surfaces of a food product, respectively. The second upper product driver may comprise a track or belt. The second upper product driver may be pivotably mounted in the machine. The second feeder system may define a second support plane on which food products are fed along a second feed direction by the second feeder system, and the second upper product driver may be rotatable about an axis perpendicular to the second feed direction and parallel to the second support plane. This enables the driver to provide improved product constraint close to the cutter, as the driver can pivot to suit variations in the shape of the upper surface of a product.

In some implementations, the transport system may be arranged to carry food products to the cutter along a food product flow path which is inclined relative to horizontal. This may facilitate improved control of slices or portions as they fall away from the cutter.

An upper surface profile only of the product may be scanned in the sensing region. Alternatively, some or all of the other sides of the product may also be sensed.

The scanners may utilise LEDs or line lasers to project a line onto the surface of the product which is then detected using sensors such as cameras. In further implementations, an array or pattern of lines (such as a plurality of parallel or intersecting lines), or any array of dots or dashes may be projected onto the food product for detection by the machine. The line profiles or other patterns generated by the lasers may then be processed by the machine to determine the profile of the product. It will be appreciated that other sensing systems for determining the external shape of a food product may be utilised, such as X-ray or "time-of-flight" systems, or sensing systems employing an array of photoelectric detectors, for example.

The present invention also provides a method of cutting portions from a food product in a food processing machine in which food products are transported through a sensing region to a cutter, the method comprising a step of controlling a sensing feed rate at which a food product is fed through the sensing region independently of a cutting feed rate downstream of the sensing region at which a food product is fed towards the cutter.

In some preferred implementations, a food product is fed through the sensing region independently of a cutting feed rate at which a food product is fed to the cutter.

The method of cutting portions may include continuously constraining the food product as it travels through the sensing region and from the sensing region to the cutter.

In some circumstances, the food processing machine may operate to feed food product at least part of the way towards the cutter at a higher feed rate than the cutting feed rate used for the food product during cutting thereof. More particularly, the machine may feed a food product through the sensing region at a higher feed rate than the cutting feed rate used for the food product during cutting thereof.

In further implementations, the method may include switching the transport system between a first feed mode in which the sensing feed rate substantially matches the cutting feed rate of the product, and a second feed mode in which a food product is fed at least part of the way towards the cutter at a higher feed rate than the cutting feed rate used for the food product during cutting thereof.

Further methods embodying the present disclosure may include selectively operating the transport system in one of a first retract mode in which both the first and second feeder systems operate so as to retract a food product away from the cutter, and a second retract mode in which only the second feeder system operates so as to retract a food product away from the cutter.

BRIEF DESCRIPTION OF THE DRAWINGS

Embodiments of the invention will now be described by way of example and reference to the accompanying schematic drawings, wherein.

DETAILED DESCRIPTION OF THE DRAWINGS

Figure 1:
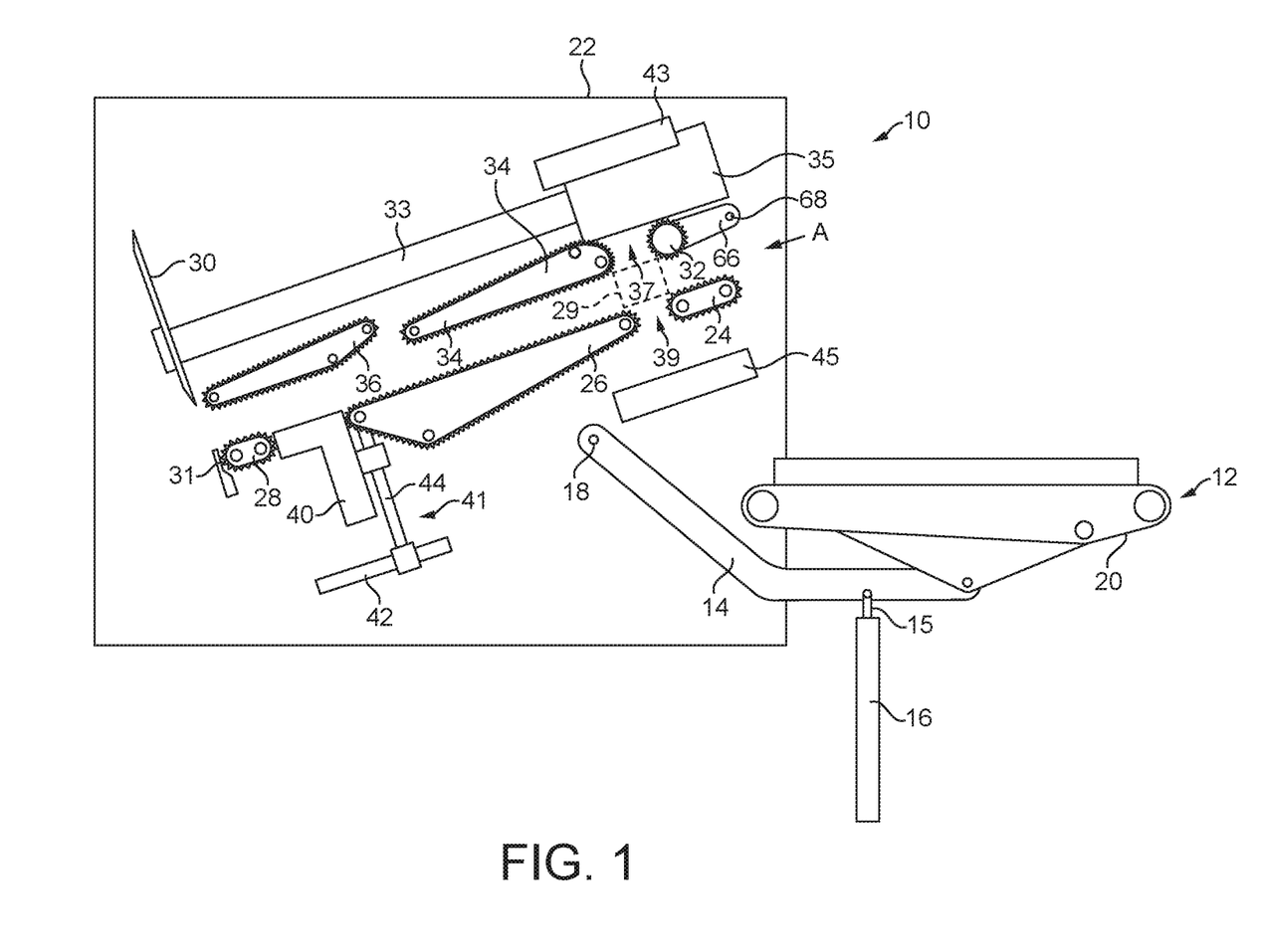
FIGS. 1 to 4 are side views of the interior of a food processing machine according to an embodiment of the invention to illustrate operation of the machine.
Figure 2:
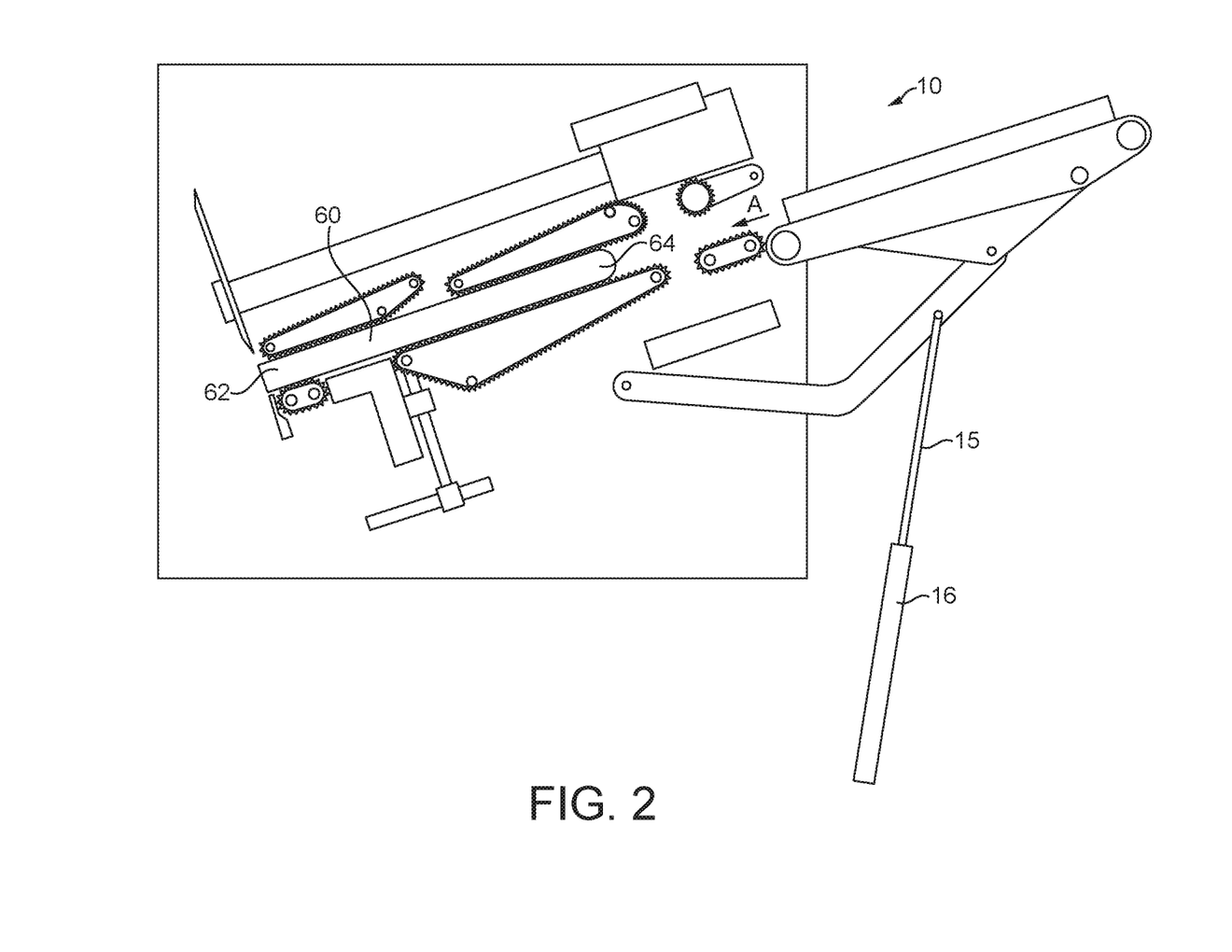

FIGS. 1 and 2 are side views of the interior of a food processing machine 10 for cutting slices or portions from elongate food products. The operation of the machine is governed by an electronic control system (not shown).

The food products are initially fed to a loading bed 12 carried by a loading arm 14. The loading bed has a horizontal orientation in FIG. 1 ready to receive the next product. The arm is coupled to a piston 15 which extends into a drive cylinder 16. The arm is rotatably mounted on a pivot 18. The arm is pivotable about pivot 18 into a raised position shown in FIG. 2 by driving the piston 15 with drive cylinder 16.

The loading bed includes a driven conveyor 20 which is operable to load a food product into the main body 22 of the machine when the loading arm is in the position shown in FIG. 2. The product is then fed in direction "A" marked in FIG. 1 along a food product flow path through the main body 22.

The food product flow path through the main body 22 is inclined at an angle relative to horizontal. The main body includes lower product feeders 24, 26 and 28 which are located below the food product flow path and operable to drive a food product towards a cutting region of the machine. In the cutting region, slices or portions are cut from the leading end of the food product by a rotatable involute blade 30 that contacts the food product. The blade is mounted on a shaft 33 which is driven by a motor 35. Upper product feeders 32, 34 and 36 are provided to engage with an upper surface of a food product to constrain it against the lower feeders and drive it towards the cutting region. The blade cuts the product as it passes over a cutting edge 31. In other embodiments, the cutting blade may alternatively be a circular blade mounted on an orbital drive assembly, a sickle blade, a knife, or a circular blade mounted on a rotating arm, for example.

The lower product feeders 24, 26 and the upper product feeders 32, 34 form a first feeder system and may each be driven by a first, common motor (not shown). The lower product feeder 28 and upper product feeder 36 form a second feeder system and may each be driven by a second, common motor (not shown). The motors may be servo motors for example.

As a food product is fed into the machine, it enters a sensing region 29 of the machine. The food product passes below a first gap 37 defined between upper product feeders 32 and 34 and above a second gap 39 defined between lower product feeders 24 and 26. The gaps allow the upper and lower surface profiles of the food product to be detected using upper and lower scanners 43 and 45, respectively. One or both of the upper and lower scanners 43, 45 may comprise a scanner or sensing system of one of the types described above.

The machine includes an end gripper 40. In FIGS. 1 and 2, the end gripper is shown in its stowed position below the food product flow path. The end gripper is carried by a gripper drive assembly 41 which is operable to move the end gripper relative to the main body 22 of the machine to bring it into engagement with a trailing end 64 of a food product 60.

The gripper drive assembly includes a first pair of parallel support rods 44, which extend perpendicular to the food product flow path. The end gripper is mounted for reciprocating motion along these rods. A second pair of support rods 42 extends parallel to the food product flow path. They carry the first pair of support rods 44 and the first pair is mounted so as to be able to reciprocate back and forth along the second pair of rods.

Preferred implementations of the end gripper are described in a co-pending UK patent application filed on 3 May 2019 by the present applicants as UK application no. 1906226.4, and the subject matter disclosed in UK application no. 1906226.4 is fully incorporated by reference herein.

The end gripper is raised by the gripper drive assembly after a food product has passed over the end gripper and then brought into engagement with the trailing end of the product during the final stage of slicing a product. The end gripper is able to grip the end of the product with teeth (not shown) to stabilise the trailing end and also to remove the end region of a food product that is not to be sliced (referred to as the "butt end") and prevent it from continuing past the blade.

A food product 60 is shown in FIG. 2 by way of illustration. The machine is operable to handle a wide range of product lengths and heights. For example, products could range between 300 and 750 mm in length and 100 to 130 mm in height. The food product shown in FIG. 2 is relatively long and some slices have already been cut from its leading end 62.

Product 60 was loaded into the machine from loading bed 12 by activating the driven conveyor 20 of the loading bed to move the product along direction A. The product was then entrained within the machine between the upper product feeder 32 and the lower product feeder 24.

In the examples shown in the drawings, the upper product feeder 32 is in the form of a spiked roller which is rotatably mounted on an arm 66. The arm 66 is in turn pivotably coupled to the main body 22 of the machine by a pivot 68. Pivot 68 has a pivotable axis which is perpendicular to the in-feed direction A and parallel to a plane defined by the upper surfaces of the lower product feeders. The lower product feeder 24 comprises a set of toothed endless chains or tracks for engaging with a lower surface of a food product and driving it in direction A.

Provision of roller 32 on arm 66 provides more reliable constraint of products having different heights as they enter and pass into the machine. Alternatively, the upper product feeder 32 may be a conveyor. The lower product feeder is preferably in the form of a conveyor elongated along direction A rather than a roller to provide greater support for the underside of a product as it enters the machine. This enables the loading bed 12 to lower sooner as the product is fed into the machine due to the control of the product provided by the feeder 24.

The upper product feeder 32 and lower product feeder 24 co-operate so as to constrain movement of the food product relative to the portions of the feeders in engagement with it. This ensures that the product is continuously and reliably constrained as it is fed between the gaps 37 and 39. The motion of the food product as it passes between the gaps is therefore closely and continuously controlled by the machine during scanning thereof by the upper and lower scanners 43 and 45.

Once a leading end of the product has passed between the gaps 37 and 39, it comes into engagement with upper product feeder 34 and lower product feeder 26. Each of these feeders may comprise a set of toothed chains or tracks. These feeders are also operable to drive the food product along direction A.

In a preferred configuration, feeders 24, 26, 32 and 34 are driven by a common motor. They therefore co-operate to drive a product which is in engagement with all four feeders as it passes between the gaps 37 and 29.

As a relatively long product is driven towards the cutter 30, it comes into engagement with upper product feeder 36 and then the lower product feeder 28, while still in engagement with upper product feeder 34 and lower product feeder 26 (and possibly also the upper and lower product feeders 32 and 24). The feeders 36 and 28 may also comprise endless toothed chains or tracks. Upper product feeders 34 and 36 are configured to urge a food product against the opposing lower product feeders 26 and 28 to ensure that the product is positively constrained by the feeders. Upper feeder 36 is pivotably mounted on the main body 22 of the machine so that it is better able to reliably engage products of varying shapes and sizes.

Whilst a product is in engagement with all four feeders 34, 36, 26 and 28, they are all driven in synchronism at the same speed to feed the product towards and past the cutter 30. The extent to which the product is fed past the cutter 30 between consecutive cuts by the blade determines the size of each slice or portion cut from the leading end 62 of the product.

The machine may be operable to cut groups of slices or portions from a food product, with each group meeting a minimum group weight requirement. In this mode of operation, it may be desirable to retract the product a short distance away from the cutter 30 between each group (in the direction opposite to direction A marked on FIG. 1). This briefly pauses the cutting so that a completed group can be conveyed away from the cutter before forming the next group. Operating the machine in this way to briefly pause cutting between groups may be referred to as a "slice denial function".

When a relatively long product is being sliced as depicted in FIG. 2, the first and second common motors of the first and second feeder systems operate to reverse all of the product feeders 24, 26, 28, 32, 34 and 36 during the slice denial function.

After a sufficient pause in slicing, the first and second feeder systems then continue to drive the product in direction A to start forming the next group of slices or portions.

Processing of relatively short food products using the machine will now be described with reference to FIGS. 3 and 4.

Figure 3:
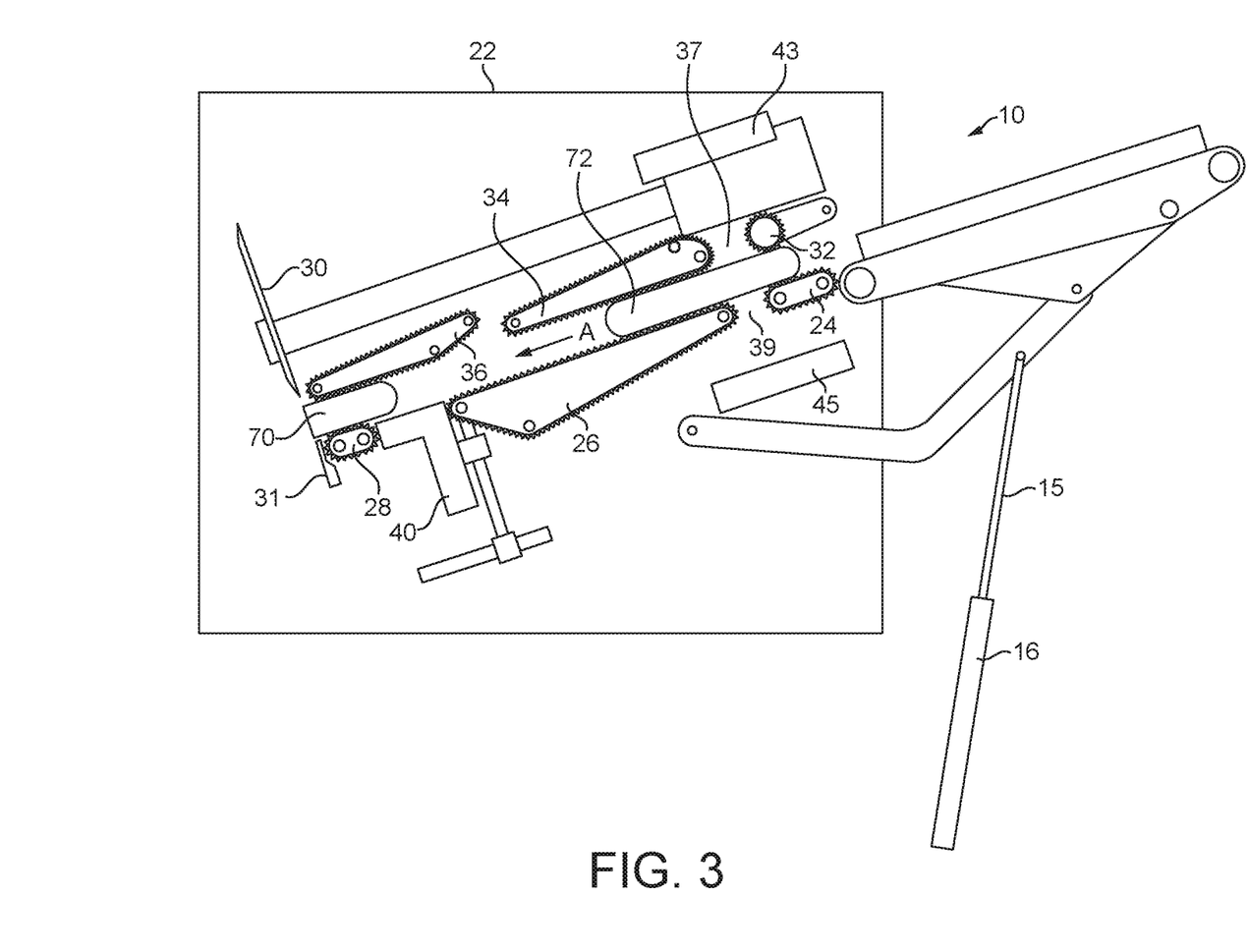
Figure 4:
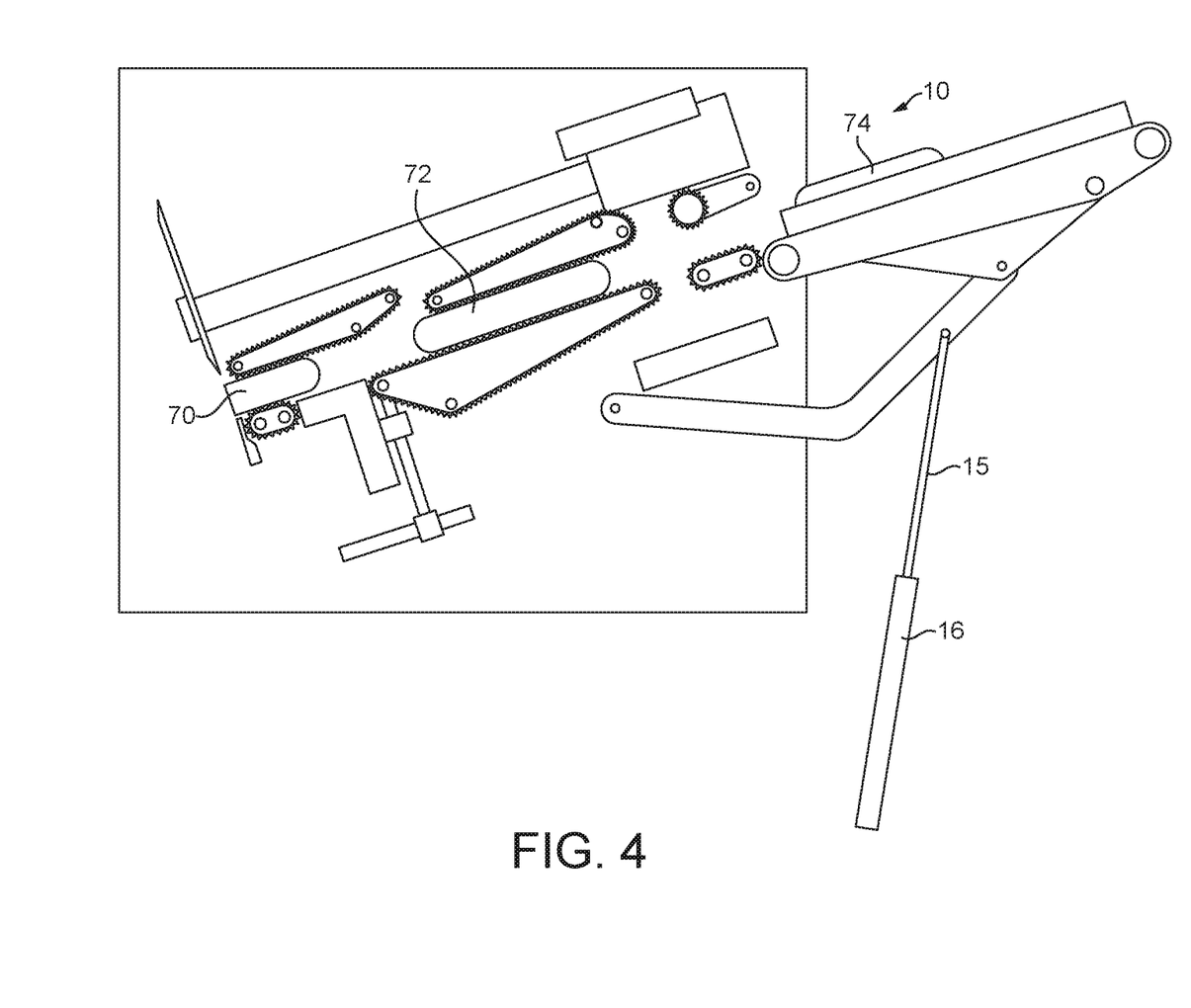

FIG. 3 depicts a stage in the slicing of such products in which food product 70 is partway through being fed past the cutter 30. The next product 72 extends between the gaps 37 and 39 and is being scanned by the scanners 43 and 45 as it moves along direction A. It can be seen that product 70 is solely being driven by the product feeders 28 and 36 of the second feeder system, whilst the next product 72 is solely being driven by the feeders 24, 26, 32 and 34 of the first feeder system. As each feeder system is driven using its own independently controllable motor, the feeding of product 70 past the blade can be controlled separately and independently of the feeding of product 72 past the scanners. Thus, the cutting feed rate and the sensing feed rate can be controlled independently and optimised to suit the respective processes.

For example, the feed rate of the next product to be sliced 72 may be increased to be greater than that of the cutting feed rate of the product 70. This may serve to reduce the time between completing of the cutting of product 70 and the start of cutting the product 72. This time may be referred to as the "reload time". Product 72 may be advanced more quickly by the first feeder system such that it is brought into engagement with the second feeder system and begins to pass over the end gripper 40 a minimal time after gripper 40 has been retracted to the stowed position shown in the drawings.

The first feeder system may be operable to feed a product through the sensing region 29 at a different rate to the rate at which it is fed between the sensing region and the second feeder system. For example, the first feeder system may increase its feed rate after scanning of a product has been completed to more quickly bring the product down towards the first feeder system. This scenario is depicted in FIG. 4 in which product 72 has left the sensing region and is only in contact with lower product feeder 26 and upper product feeder 34, and the following product 74 has not yet been brought into engagement with the first feeder system.

The following enumerated paragraphs represent illustrative, non-exclusive ways of describing inventions according to the present disclosure.

A. A food processing machine comprising:
　a cutter configured to interact with a food product in order to cut portions from the food product;
　a transport system arranged to carry the food product toward the cutter; and
　a sensing apparatus configured to sense a profile of part of the food product as the food product is carried through a sensing region of the machine by the transport system,
　wherein the transport system comprises:
　a first feeder system which feeds the food product through the sensing region at a sensing feed rate; and
　a second feeder system downstream of the sensing region which feeds the food product toward the cutter at a cutting feed rate, and
　the machine is arranged to control the sensing and cutting feed rates independently such that the sensing feed rate and the cutting feed rate may feed the food product through the respective portions of the transport system at different speeds.

A1. A machine of paragraph A, wherein a food product is continuously constrained by the transport system as the food product travels through the sensing region and from the sensing region to the cutter.

A2. A machine of paragraph A or paragraph A1, wherein the transport system is configured to feed the food product at least part of the way towards the cutter at a second cutting feed rate that is higher than the cutting feed rate.

A2.1. A machine of paragraph A2, wherein the transport system is configured to feed a food product through the sensing region at a sensing feed rate which is greater than the cutting feed rate used for the food product during cutting thereof.

A3. A machine of any preceding paragraph, wherein the transport system is switchable between a first feed mode in which the sensing feed rate is equal to the cutting feed rate, and a second feed mode in which another food product is fed by the transport system at least part of the way towards the cutter at a higher feed rate than the cutting feed rate used for the food product that is adjacent to the cutter.

A3.1. A machine of paragraph A3, wherein the transport system is configured to feed the another food product through the sensing region in the second feed mode at a sensing feed rate which is greater than the cutting feed rate used for the food product.

A4. A machine of any preceding paragraph, wherein the transport system is selectively operable in one of a first retract mode in which both the first and second feeder systems are operated so as to retract the food product away from the cutter, and a second retract mode in which only the second feeder system is operated so as to retract the food product away from the cutter.

A5. A machine of any preceding paragraph, wherein the first feeder system comprises product drivers located upstream and downstream of the sensing region. A5.1. A machine of paragraph A5, wherein the upstream and downstream product drivers of the first feeder system are driven by a common motor.

A6. A machine of any preceding paragraph, wherein the first feeder system comprises first upper and first lower product drivers configured to engage with upper and lower surfaces of the food product, respectively.

A6.1. A machine of paragraph A6, wherein the first upper and first lower product drivers are located upstream of the sensing region.

A6.2. A machine of paragraph A6 or paragraph A6.1, wherein the first upper product driver comprises a roller.

A6.3. A machine of any of paragraphs A6 to A6.2, wherein the first upper product driver is carried by an arm which is pivotably mounted in the machine, the first feeder system defines a first support plane on which food products are fed along a first feed direction by the first feeder system, and the arm is rotatable about an axis perpendicular to the first feed direction and parallel to the support plane.

A6.4. A machine of any of paragraphs A6 to A6.3, wherein the first lower product driver comprises an endless track or belt.

A7. A machine of paragraph A5 or any of paragraphs A5.1 or A6 to A6.4 when dependent on paragraph A5, wherein the downstream product drivers comprises downstream upper and downstream lower endless drive tracks or belts configured to engage upper and lower surfaces of the food product, respectively.

A8. A machine of any preceding paragraph, wherein the second feeder system comprises second upper and second lower product drivers configured to engage with upper and lower surfaces of the food product, respectively.

A8.1. A machine of paragraph A8, wherein the second upper product driver comprises a track or belt, the second upper product driver is pivotably mounted in the machine, the second feeder system defines a second support plane on which food products are fed along a second feed direction by the second feeder system, and the second upper product driver is rotatable about an axis perpendicular to the second feed direction and parallel to the second support plane.

A9. A machine of any preceding paragraph, wherein the transport system is arranged to carry food products to the cutter along a food product flow path which is inclined relative to horizontal.

B. A method of cutting portions from a food product in a food processing machine in which food products are transported through a sensing region to a cutter, the method comprising a step of controlling a sensing feed rate at which a food product is fed through the sensing region independently of a cutting feed rate at which the food product is fed to the cutter.

B1. A method of paragraph B including:
continuously constraining the food product as it travels through the sensing region and from the sensing region to the cutter.

B1.1. A method of paragraph B or paragraph B1 including:
feeding the food product at least part of the way towards the cutter at a second cutting feed rate than the cutting feed rate used for the food product.

B1.2. A method of paragraph B1.1 including:
feeding a second food product through the sensing region at a higher sensing feed rate than the cutting feed rate used for the food product.

B1.3. A method of any of paragraphs B to B1.2 including:
switching the transport system between a first feed mode in which the sensing feed rate substantially matches the cutting feed rate of the product, and a second feed mode in which a food product is fed at least part of the way towards the cutter at a higher feed rate than the cutting feed rate used for the food product.

B1.4. A method of any of paragraphs B to B1.3 including:
selectively operating the transport system in one of a first retract mode in which both the first and second feeder systems operate so as to retract a food product away from the cutter, and a second retract mode in which only the second feeder system operates so as to retract a food product away from the cutter.

The invention claimed is:

1. A food processing machine comprising:
a cutter configured to cut portions from a food product;
a transport system arranged to carry a food product to the cutter; and
a sensing apparatus configured to sense a profile of part of the food product as the food product is carried through a sensing region of the machine by the transport system,
wherein the transport system comprises:
a first feeder system which feeds the food product into and through the sensing region at a sensing feed rate, wherein the first feeder system comprises first upper and first lower product drivers configured to engage with upper and lower surfaces of the food product, respectively, the first upper and lower product drivers are located upstream of the sensing region; and
a second feeder system downstream of the sensing region which feeds the food product towards the cutter at a cutting feed rate, and
the machine is arranged to control the sensing and cutting feed rates independently,
wherein a food product is continuously constrained by the transport system as the food product travels before the sensing region, through the sensing region and from the sensing region to the cutter and the first and second feeder systems engage with both upper and lower surfaces of the food product to constrain it, and
wherein the first upper product driver is mounted on a pivotable arm, the pivotable arm being configured to bias the first upper product driver towards the first lower product driver such that a biasing force exerted by the pivotable are is varied based on a height of the food product so that the first upper product driver reliably constrains the food product against the first lower product driver.

2. The machine of claim 1, wherein the transport system is configured to feed the food product at least part of the way towards the cutter at a higher feed rate than the cutting feed rate used for the food product during cutting thereof.

3. The machine of claim 2, wherein the transport system is configured to feed the food product through the sensing region at a sensing feed rate which is greater than the cutting feed rate used for the food product during cutting thereof.

4. The machine of claim 1, wherein the transport system is switchable between a first feed mode in which the sensing feed rate is equal to the cutting feed rate, and a second feed mode in which the food product is fed by the transport system at least part of the way towards the cutter at a higher feed rate than the cutting feed rate used for the food product during cutting thereof.

5. The machine of claim 4, wherein the transport system is configured to feed the food product through the sensing region in the second feed mode at a sensing feed rate which is greater than the cutting feed rate used for the food product during cutting thereof.

6. The machine of claim 1, wherein the transport system is selectively operable in one of a first retract mode in which both the first and second feeder systems are operated so as to retract the food product away from the cutter, and a second retract mode in which only the second feeder system is operated so as to retract a food product away from the cutter.

7. The machine of claim 1, further comprising second product drivers located downstream of the sensing region.

8. The machine of claim 7, wherein the second product drivers comprise second upper and the second lower product drivers, the second upper and lower product drivers include respective upper and downstream lower endless drive tracks or belts configured to engage respective upper and lower surfaces of the food product.

9. The machine of claim 1, wherein the first upper and the first lower product drivers of the first feeder system are driven by a common motor.

10. The machine of claim 1, wherein the first upper product driver comprises a roller that is configured to engage the upper surface of the food product to constrain the upper surface of the food product.

11. The machine of claim 1, wherein the first feeder system defines a first support plane on which food products are fed along a first feed direction by the first feeder system, and the pivotable arm is rotatable about an axis perpendicular to the first feed direction and parallel to the support plane.

12. The machine of claim 1, wherein the first lower product driver comprises an endless track or belt.

13. The machine of claim 1, wherein the second feeder system comprises second upper and second lower product drivers configured to engage with upper and lower surfaces of the food product, respectively.

14. The machine of claim 13, wherein the second upper product driver comprises a track or belt, the second upper product driver is pivotably mounted in the machine, the second feeder system defines a second support plane on which food products are fed along a second feed direction by the second feeder system, and the second upper product driver is rotatable about an axis perpendicular to the second feed direction and parallel to the second support plane.

15. The machine of claim 1, wherein the transport system is arranged to carry food products to the cutter along a food product flow path which is inclined relative to horizontal.

16. The machine of claim 1, wherein the first feeder system further comprises second upper and second lower product drivers configured to engage with upper and lower surfaces of the food product, respectively, the second upper and lower product drivers are located downstream of the sensing region, and wherein the first upper product driver has a longitudinal length that is shorter than a longitudinal length of the first lower product driver and the second upper product driver has a longitudinal length that is shorter than a longitudinal length of the second lower product driver; and wherein the second feeder comprises third upper and third lower product drivers configured to engage with upper and lower surfaces of the food product, respectively, the third upper and lower product drivers are located downstream of the second upper product driver of the first feeder system, wherein the third upper product driver has a longitudinal length that is longer that a longitudinal length of the third lower product driver and at least a portion of the third upper product driver longitudinally overlaps with at least a portion of the second lower product driver of the first feeder system.

17. The machine of claim 16, wherein the second upper and the second lower product drivers comprises downstream upper and downstream lower endless drive tracks or belt configured to engage upper and lower surfaces of the food product, respectively.

18. A method of cutting portions from a food product in a food processing machine in which food products are transported through a sensing region to a cutter, wherein the machine comprises a transport system arranged to carry the food product to the cutter, wherein the transport system includes a first feeder system that feeds the food product into and through the sensing region at the sensing feed rate, and a second feeder system downstream of the sensing region that feeds the food product towards the cutter at the cutting feed rate, the method comprising a step of controlling a sensing feed rate at which a food product is fed through the sensing region independently of a cutting feed rate at which the food product is fed towards the cutter downstream of the sensing region, and continuously constraining the food product as it travels before the sensing region, through the sensing region and from the sensing region to the cutter, with the first and second feeder systems engaging with both upper and lower surfaces of a food product to constrain it, wherein the first feeder system comprises first upper and first lower product drivers configured to engage with upper and lower surfaces of the food product, respectively, the first upper and lower product drivers are located upstream of the sensing region and, wherein the first upper product driver is mounted on a pivotable arm, the pivotable arm being configured to bias the first upper product driver towards the first lower product driver such that a biasing force exerted by the pivotable arm is varied based on a height of the food product so that the first upper product driver reliably constrains the food product against the first lower product driver.

19. The method of claim 18 comprising:
feeding the food product at least part of the way towards the cutter at a higher feed rate than the cutting feed rate used for the food product during cutting thereof.

20. The method of claim 19 comprising:
feeding the food product through the sensing region at a higher feed rate than the cutting feed rate used for the food product during cutting thereof.

21. The method of claim 18 comprising:
switching the transport system between a first feed mode in which the sensing feed rate substantially matches the cutting feed rate of the product, and a second feed mode in which the food product is fed at least part of the way towards the cutter at a higher feed rate than the cutting feed rate used for the food product during cutting thereof.

22. The method of claim 18 comprising:
  selectively operating the transport system in one of a first retract mode in which both the first and second feeder systems operate so as to retract the food product away from the cutter, and a second retract mode in which only the second feeder system operates so as to retract a food product away from the cutter.

\* \* \* \* \*